(12) United States Patent
Howard et al.

(10) Patent No.: US 12,737,764 B2
(45) Date of Patent: Sep. 15, 2026

(54) MERCHANT SPECIFIC MACHINE LEARNING MODEL FOR FRAUD DETECTION

(71) Applicant: STRIPE, LLC, South San Francisco, CA (US)

(72) Inventors: Logan Howard, San Francisco, CA (US); Ryan Drapeau, Seattle, WA (US); Nathan Brasher, Austin, TX (US)

(73) Assignee: Stripe, LLC, South San Francisco, CA (US)

( * ) Notice: Subject to any disclaimer, the term of this patent is extended or adjusted under 35 U.S.C. 154(b) by 23 days.

(21) Appl. No.: 18/513,104

(22) Filed: Nov. 17, 2023

(65) Prior Publication Data

US 2025/0165978 A1 May 22, 2025

(51) Int. Cl.
*G06Q 20/40* (2012.01)

(52) U.S. Cl.
CPC ................................ *G06Q 20/4016* (2013.01)

(58) Field of Classification Search
CPC .................................................. G06Q 20/4016
USPC ........................................................... 705/44
See application file for complete search history.

(56) References Cited

U.S. PATENT DOCUMENTS 11,386,488 B2 * 7/2022 Atieque ................. G06Q 40/03
2020/0211020 A1 * 7/2020 Allbright ............... G06N 20/10
2021/0398129 A1 * 12/2021 Sharma .................... G06N 3/08
2022/0044250 A1 * 2/2022 Allbright ............... G06N 20/10
2024/0095742 A1 * 3/2024 Chen ...................... G06N 20/00
2024/0211951 A1 * 6/2024 Hosseinali ............. G06N 20/20
2024/0211966 A1 * 6/2024 Hosseinali ......... G06Q 30/0185
2025/0104073 A1 * 3/2025 Chou ..................... G06N 20/00

* cited by examiner

*Primary Examiner* — Hai Tran
(74) *Attorney, Agent, or Firm* — Finnegan, Henderson, Farabow, Garrett & Dunner, LLP

(57) ABSTRACT

A server computer system for detecting a fraudulent electronic transaction may be configured to receive a transaction associated with a merchant. The system processes the transaction with a first machine learning model that is trained specific to the merchant, to obtain a first fraud detection, and processes the transaction with a second machine learning model that is trained based on a plurality of merchants, to obtain a second fraud detection. The system detects fraud associated with the transaction based on the first fraud detection and the second fraud detection. In response to detecting the fraud that is associated with the transaction, the system blocks the transaction.

20 Claims, 6 Drawing Sheets

MERCHANT SPECIFIC MACHINE LEARNING MODEL FOR FRAUD DETECTION

BACKGROUND

Service provider systems provide various services to user systems over computing networks. The services provided can include commercial transaction processing services, media access services, customer relationship management services, data management services, medical services, etc., as well as a combination of such services.

During operations performed by the service provider system during performance of a transaction, the services of the service provider system may generate and store, or seek to access stored, data associated with the service, the transaction, or other data. The data may include data associated with transaction bookkeeping purposes, record keeping purposes, regulatory requirements, end user data, service system data, third party system data, as well as other data that may be generated or accessed during the overall processing of the transaction. The service provider systems may perform millions, billions, or more transactions per hour, day, week, etc., resulting in an enormous scale of data generation and access operations of the services of the service provider system.

To perform transactions, many technical challenges arise. For example, bad actors may seek to exploit such a platform to conduct a fraudulent transaction for their own gain. A service provider system may include safeguards or checks to prevent or help reduce the likelihood of fraudulent transactions.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
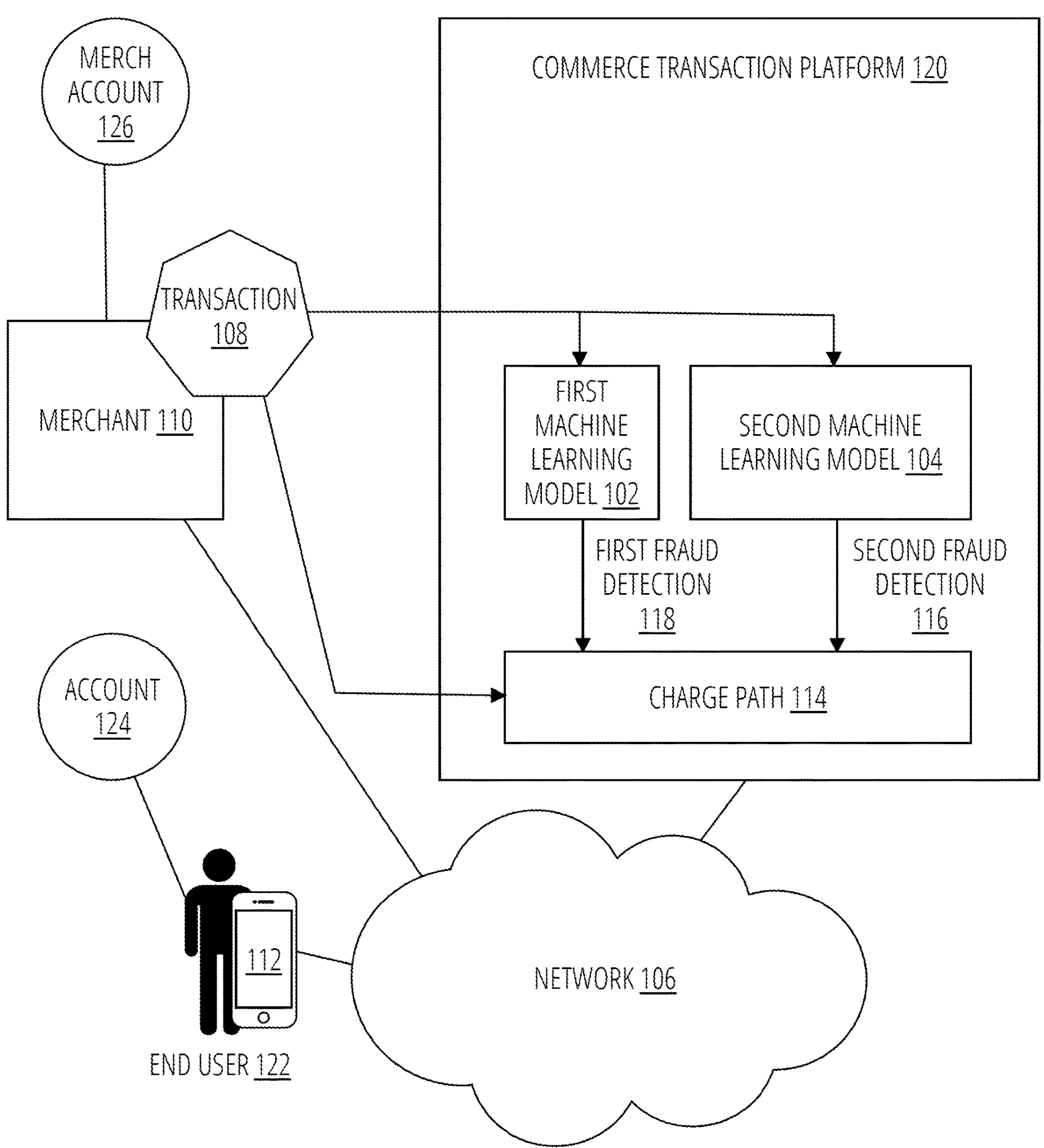
FIG. 1 shows a commerce transaction platform with dual machine learning model for fraud detection, in accordance with an embodiment.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "processing", "storing", "detecting", "blocking", "completing", "sending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 shows a commerce transaction platform 120 with dual machine learning model, in accordance with an embodiment. Commerce transaction platform 120 may include one or more server computer systems for detecting a fraudulent electronic transaction (e.g., transaction 108). Commerce transaction platform 120 may be in communication with a computer network 106 through a computer communication protocol (e.g., TCP/IP, etc.).

Generally, commerce transaction platform 120 may perform operations that authorize a transaction (e.g., transaction 108) to be completed, and triggers an exchange (e.g., transfer money from an account 124 of an end user 122 to merchant account 126 of a merchant 110). End user 126 may, in some cases, be referred to as a customer or potential customer of merchant 110. An end user 122 may engage with a merchant 110 (e.g., a merchant website, a merchant application, a point of sales at a physical retail location, or other merchant platform) to conduct a transaction. In an example, the end user may operate a network connected device 112 to engage with the merchant, although not necessarily. The device 112 may be connected to the merchant platform through computer network 106 to initiate a transaction 108 (e.g., to buy or sell a product, to transfer money, etc.).

An end user 122 may provide information associated with their account 124, either digitally through user device 112 or in person (e.g., to a point of sales machine of merchant 110). Account 124 may include a debit card, a credit card, a checking account, a savings account, a digital payment application, or other account that may transfer credits or funds. The provided information (e.g., payment information) may include card numbers (e.g., credit card, debit card), checking account numbers, savings account numbers, username/passwords, etc., which may be used by commerce transaction platform 120 to authorize the transaction 108 between the end user 122 and merchant 110. Commerce transaction platform 120 may vet the transaction 108 based on transaction details which may include information provided by end user 122. If vetted, commerce transaction platform 120 may forward the payment information to merchant account 126 and provide authorization of the transaction to the merchant account 126, to trigger the exchange between merchant account 126 and account 124.

Commerce transaction may use machine learning models 102 and 104 to determine whether or not end user 122 is a bad actor that seeks to make a fraudulent transaction. The commerce transaction platform 120 may receive the transaction 108 associated with the merchant 110. In an example, the commerce transaction platform 120 may receive a message (e.g., a request or API call) over network 106, from the merchant 110, that indicates a requested transaction between end user 122 and merchant 110. Merchant 110 may comprise one or more computer systems. In some cases, merchant 110 and merchant account 126 may be integrated. The transaction 108 may include transaction information such as the payment information of the end user's account 124, and other details such as time stamp information, the end user's location, an intended shipping address, an address associated with the account 124, a platform on which the end user 122 is attempting to make the transaction (e.g., at a physical store, the website or application that the end user 122 is using, etc.), and/or other details.

The commerce transaction platform 120 may process the transaction 108 with a first machine learning model 102 that is trained specific to the merchant 110, to obtain a first fraud detection 118. The commerce transaction platform 120 may process the same transaction 108 with a second machine learning model 104 that is trained based on a plurality of merchants (which may include merchant 110 as well as other merchants not shown), to obtain a second fraud detection 116.

The first machine learning model 102 may be referred to as a targeted machine learning model that is specific to merchant 110. The first machine learning model 102 may be trained with transactions solely from merchant 110, to detect a particular type of fraudulent activity or a particular attacker that is associated with that merchant. The first machine learning model may then be applied to subsequent transactions for that merchant. For example, the first machine learning model 102 may be trained with first training data comprising first past transactions of a single merchant which is the same as the merchant 110 that the first machine learning model 102 is then applied with respect to. Second machine learning model 104 may be referred to as a general machine learning model that may be trained with second past transactions from a wider set of merchants (e.g., a plurality of merchants).

The machine learning models may be referred to as trained algorithms that take, as input, the transaction data (e.g., as features). Features of a transaction 108 may include any combination of sale information, transaction amount, time of day, user location, shipping location, account information, user ID, or other features they may or may not be discussed herein. Each machine learning model may generate an output based on the input (e.g., a first fraud detection 118 generated by first machine learning model 102, and a second fraud detection 116 generated by second machine learning model 104. Each output may represent the respective machine learning model's prediction as to whether or not transaction 108 is associated with fraud. Fraud detection 118 and fraud detection 116 may each comprise respective values (e.g., a binary value (e.g., fraud or not fraud), or a score (e.g., from 0 to 100)) that indicates whether or not the transaction 108 is a fraudulent one. A variety of machine learning algorithms may be implemented as first machine learning model 102 and second machine learning model 104, however, examples are discussed further in other sections.

Commerce detection platform 120 may determine whether or not fraud is associated with transaction 108, based on the first fraud detection 118 and/or second fraud detection 116. Commerce transaction platform 120 may, at charge path 114, block the transaction, in response to detecting the fraud that is associated with the transaction. Blocking a transaction may include refraining from forwarding the request to commit the transaction to the merchant account 126 and account 124.

In such a manner, commerce transaction platform may block fraud that may be prevalent across multiple merchants, while simultaneously adapting to attack patterns that may be specific to merchant 110. As described in other sections, first machine learning model 102 may be trained and deployed in a dynamic matter to respond to recent attack patterns.

Figure 2:
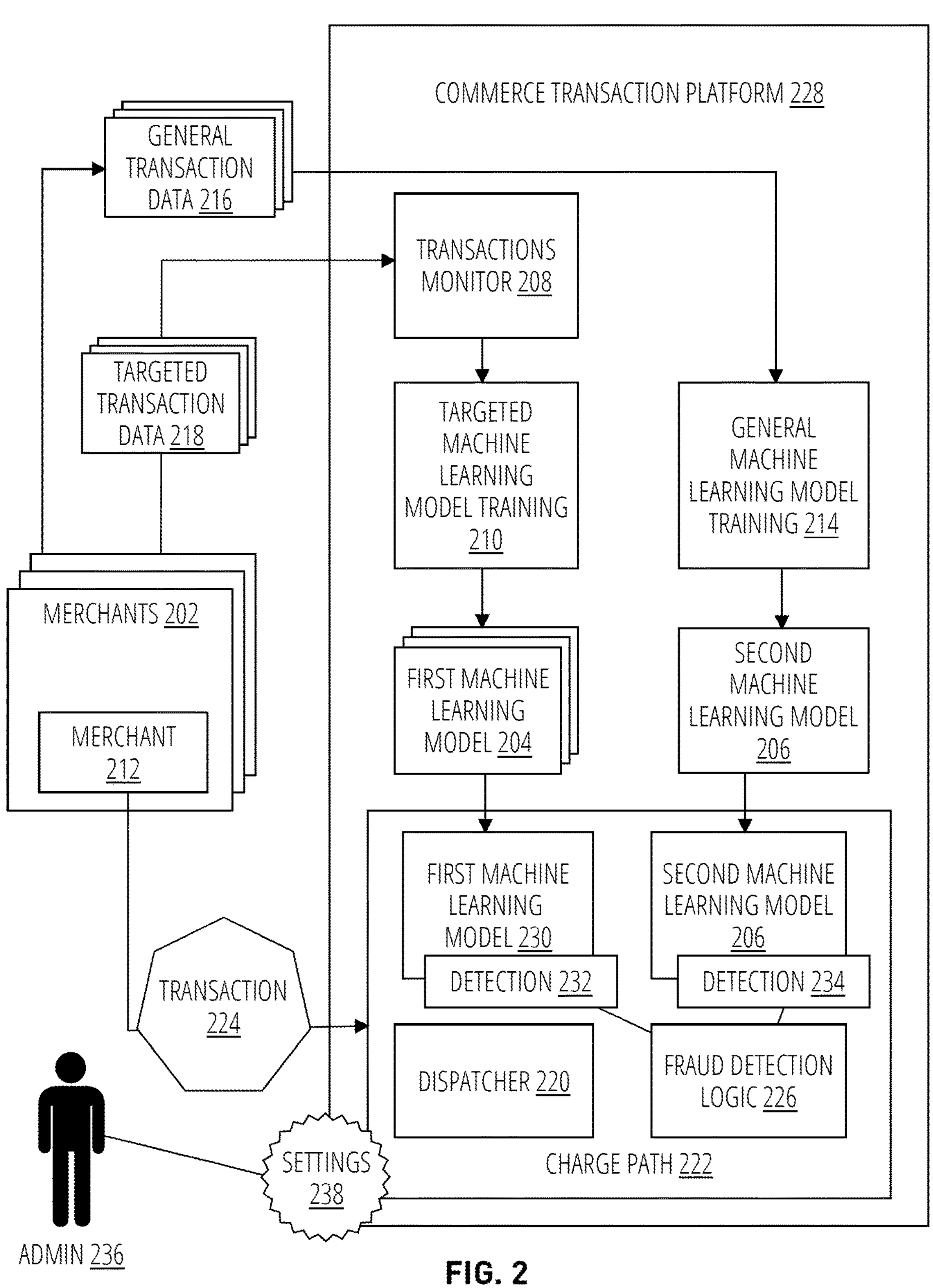
FIG. 2 shows a commerce transaction platform with fraud monitoring and a dual machine learning model for fraud detection, in accordance with an embodiment.

FIG. 2 shows a commerce transaction platform 228 with dual machine learning model for fraud detection, in accordance with an embodiment. Commerce transaction platform 228 may include features described with respect to commerce transaction platform 120, and vice versa, but may not be expressly stated for sake of brevity and clarity. Generally, embodiments described with respect to one figure may apply to embodiments described with respect to another figure.

Commerce transaction platform 228 may include one or more server computer systems for detecting a fraudulent electronic transaction (e.g., transaction 224). When a transaction 224 is in progress between an end user and a merchant (e.g., merchant 212), commerce transaction platform 228 may serve as an intermediary to vet the transaction and determine whether or not to block the transaction 224 or forward the transaction to the merchant account to complete the transaction 224. Completion of a transaction may include transferring funds from the end user to the merchant, from the merchant to the end user, initiating delivery of goods, etc., as defined by transaction terms between the end user and merchant.

Commerce transaction platform may comprise one or more first machine learning models 204 and a second machine learning model 206 that it uses to block or complete each transaction. Commerce transaction platform 228 may train one or more first machine learning models 210, which may each be specific to one of merchants 202. For example, first machine learning model 230 of first machine learning models 204 may be trained with transactions solely from merchant 212, and a second one of first machine learning models 204 may be trained with transactions solely from another one of merchants 202. Each of the one or more first machine learning models 204 may be targeted to detect a particular type of fraudulent activity through training of a shorter time duration that includes or focuses on a spike of such fraudulent activity. Each of targeted transaction data 218 may be referred to as first past transactions for a particular merchant.

Commerce transaction platform 228 may dynamically train and deploy the one or more first machine learning models. Commerce transaction platform 228 may, at block 208, monitor transactions for each merchant. The commerce transaction platform 120 may train one of the first machine learning models at block 210 automatically (e.g., without human input), based on the monitoring of merchant transaction activity.

For example, in response to monitoring that fraud activity with one of merchants 202 satisfies a threshold (e.g., 'X' number of reported fraudulent transactions reported within 'Y' days and/or 'Z' number of total transactions), the commerce transaction platform 228 may train one of the first machine learning models 204 with targeted training data 218 comprising transactions solely from that merchant. The targeted training data 218 may be selected to include transactions that occurred during the duration in which the spike of fraudulent transactions occurred (e.g., the transactions within the 'Y' days and/or 'Z' number of total transactions). In an example, this duration may start when the number of fraudulent transactions exceeds a threshold and may end when the number of fraudulent transactions no longer exceeds the threshold. The limited training dataset may train each of the first machine learning models 204 to target the fraudulent activity that is likely share a common signature (e.g., similar set of features). This may improve fraud detection of a specific attack type or from a specific attacker for a given merchant.

In an embodiment, the first machine learning model 204 comprises a decision tree, or a gradient boosted decision tree (GBDT), or other ensemble machine learning algorithm. Decision trees may predict a label (e.g., fraud or not fraud) that is associated with training data (e.g., labeled sets of transaction data) by evaluating a tree of if-then-else true/false feature questions, and estimating a minimum number of questions to assess the probability of making a correct decision. Decision trees can be used for classification to predict a category (e.g., fraud or not fraud), or regression to predict a continuous numeric value (e.g., a likelihood of fraud score from 0 to 100).

First machine learning model 204 may include a decision tree ensemble learning algorithm. An ensemble learning algorithm may combine predictions from multiple machine learning algorithms to obtain an improved prediction (e.g., a more accurate prediction of whether or not a transaction should be flagged as fraudulent in view of the transaction details). The number of combined algorithms in an ensemble learning algorithm and how they are combined, may vary depending on application.

For example, using a bagging technique, a decision tree ensemble learning algorithm may fit multiple decision trees on different samples of the same dataset, and average the predictions (fraud or not fraud) of all of the individual decision trees to obtain the fraud detection.

In another example, using a stacking technique, an ensemble learning algorithm may include diverse set of model types (e.g., linear models, decision trees, support vector machines, neural networks, random forests) that are trained on the same data to each make predictions (e.g., fraud or not fraud), and using another model (e.g., a linear model or other type of machine learning model) that is trained on how to combine the predictions from the diverse set of models.

In another example, using a boosting technique, machine learning algorithms (e.g., decision trees or other types of machine learning models) may be added sequentially (e.g., one after another) where each added machine learning algorithm (which may also be referred to as an ensemble member) corrects the predictions made by prior models.

First Machine learning model 204 may include an ensemble learning model (e.g., bagging, stacking, or boosting) that improves prediction of fraud or not fraud by leveraging multiple combined models. In an example, first machine learning model 204 includes a decision tree ensemble learning algorithm (e.g., bagging technique), to leverage multiple decision tree models (e.g., random forest models) that make weaker but faster predictions in parallel, and then combines these weaker predictions to make an accurate prediction (e.g., within a threshold error of a target prediction).

In an example, first machine learning model 204 may comprise a gradient boosted decision tree (GBDT) ensemble learning algorithm. Gradient boosting sets targeted outcomes for each added model while minimizing errors. Targeted outcomes for each training set are based on a gradient (e.g., a direction of change) of the error with respect to a prediction (e.g., fraud or not fraud). GBDTs iteratively train an ensemble of decision trees, with each iteration using the error residuals of the previous model to fit the next model. The final prediction is a weighted sum of all of the tree predictions.

In an example, the first machine learning model 204 may comprise an XGBoost machine learning model which may be understood as a hybrid model of bagging and boosting. In such an example, the decision trees in the model may be built in parallel, instead of sequentially like GBDT. The decision trees may be scanned to obtain gradient values (e.g., direction of differences in predictions) and using these to evaluate the quality of each tree split in the training set and to adjust (e.g., pruning, terminating, or creating new splits) accordingly. Such a model may be highly portable and efficient, thus being an advantageous choice for first machine learning model 102 which may be deployed or deprecated dynamically, as described herein.

In an example, commerce transaction platform may automatically train multiple machine learning models in response to monitoring a spike of fraudulent activity (e.g., above a threshold amount) for a given merchant. The multiple machine learning models may be trained using the limited data set in which the spike occurred, and the most accurate one of those trained models (e.g., that best predict fraud based on the labels in the limited training data set) may be selected as the first machine learning model 204 which is to be deployed for that merchant that experienced the spike. In an example, fraud activity is continuously monitored on a per-merchant basis, and multiple machine learning models are tested for a single spike based on the training data from that spike, to deploy the machine learning model best suited for that spike, which may vary in duration and signature (e.g., transaction features). Thus, one machine learning model architecture may be trained and deployed as first machine learning model for a first spike, while another is trained and deployed automatically as the first machine learning model for a second spike.

Commerce transaction platform 228 may obtain general transaction data 216 that is associated with a plurality of transactions of a plurality of merchants 202. At block 214, commerce transaction platform 228 may train second machine learning model 206 with the general transaction data 216. The general transaction data 216 may include labeled transaction data, with the labels indicating whether or not each transaction in the general transaction data 216 is associated with fraud. Second machine learning model 206 may correspond to second machine learning model 104. Second machine learning model 104 may be referred to as a general machine learning model that is trained to predict fraud based on a larger set of transactions from a wider set of merchants and may span a longer duration, relative to training data for first machine learning model 102. For example, the transactions in the general transaction data 216 may have occurred within a longer duration than the sets of targeted transaction data 218. Additionally, or alternatively, the targeted transaction data 218 may span a more recent period of time than general transaction data 216, to train models to focus on a recent spike of fraud activity.

In an embodiment, the second machine learning model comprises an artificial neural network (ANN). For example, the second machine learning model may comprise a deep neural network (DNN) such as a convolutional neural network. A neural network may include a plurality of layers, each layer containing a plurality of nodes which can be understood as artificial neurons. The nodes of an input layer can receive the transaction details (e.g., features) of a transaction. Each node can have an edge that connects the node to one or more nodes in a subsequent layer. Each edge can have a weight that determines the impact of the node towards the node of the subsequent layer that the node is connected to. Each layer can have such nodes with such edges that connect to one or more nodes of subsequent layers. Each node can have an activation function that includes a weighted sum of the inputs to the node which determines if the node is activated or how activated the node is. An output layer of the neural network can produce an output (e.g., fraud or not fraud, or a fraud score) for the given transaction and details thereof.

A machine learning model such as an ANN or other machine learning model may be trained using a training dataset that include transaction details of a transaction as input and a corresponding desired output (e.g., a label indicating ground truth data of whether or not a transaction was reported as fraudulent). For example, the training dataset may include as input, various transaction details (e.g., amount, good or goods under transaction, time of day, location of buyer, shipping location, billing location, distance between shipping location and billing location, payment information, etc.,). The training set may include, as a desired output, a label indicating fraud or not fraud. These inputs and the desired output of the training data can be described as input-output pairs, and these pairs can be used to train the machine learning model in a process that may be understood as supervised training. The size of the dataset can vary depending on application. The dataset can vary in terms of sample size, numbers of gaze directions trained, number of microphone signals, and different tones and words used in the speech.

Training an artificial neural network can involve using an optimization algorithm to calculate the value of the weights to best map the given inputs to the targeted output. The training of the machine learning model can include using non-linear regression (e.g., least squares) to optimize a cost function to reduce error of the output of the machine learning model (e.g., predicting fraud when the transaction is labeled as not fraud). Errors (e.g., between the output and the approved output) are propagated back through the machine learning model during training, causing an adjustment of the weights which control the neural network algorithm. This process occurs repeatedly for each recording, to adjust the weights such that the errors are reduced. The same set of training data (e.g., labeled transactions from the plurality of merchants 202) can be processed a plurality of times to refine the weights. The training can be completed once the errors are reduced to satisfy a threshold.

The second machine learning model 206 may be trained with training data comprising transactions for a plurality of merchants which may or may not include merchant 212. In an embodiment, the training dataset may be for a general duration of time (e.g., 6 months or longer) that is not directed specifically at a spike or anomaly of fraudulent activity.

Generally, training data for first machine learning models 204 or second machine learning model 206 may include past transactions that are labeled as fraudulent based on merchant reporting, dispute filing (e.g., reporting from defrauded users), or other sources. In some cases, at block 210, if the amount of training data is insufficient (e.g., less than a threshold amount of labeled transactions), then commerce transaction platform 228 may determine post-charge signals labeling transactions as fraudulent. For example, transactions that are associated with users or payment information (e.g., a payment card or account) that, after a non-fraudulent transaction, go on to be used suspiciously (e.g., flagged as fraudulent) may be included in targeted transaction data 218 or general transaction data 216. Training data (e.g., 216, 218) may include various features associated with a transaction such as, for example, the amount of transaction, authorization rate for the amount of the merchant, time of transaction, location of mailing address, distance between a billing address of the end user and shipping address of the end user for a product, frequency of transactions in a period of time, frequency of transactions with same payment information or for the same product, or other features described. Features are generalized variables or attributes generated based on data (e.g., a transaction). Generally, training of the machine learning models may include iteratively processing training data with machine learning models to adjust the algorithms (e.g., weights or parameters) so that, with each iteration, the error between the output and the ground truth data (e.g., the labeling of the training data) is reduced.

Commerce transaction platform 228 may process an in-progress transaction 224 using one of the first machine learning models 204 and the second machine learning model 206. When a transaction 224 is in-progress (e.g., initiated, but no transfer of funds has yet occurred), the commerce transaction platform 228 may (at dispatcher block 220), match the merchant 212 that is associated with the in-progress transaction 224 with one of the first machine learning models 204 that is trained for that merchant 212.

Assuming that first machine learning model 230 is trained with training data solely associated with merchant 212 (e.g., triggered by a spike of fraudulent activity experienced by merchant 212), commerce transaction platform 120 may match merchant 212 to first machine learning model 230. Commerce transaction platform 228 may apply the matched first machine learning model 230 to the transaction 224 and features thereof (e.g., sale information, transaction amount, time of day, user location, shipping location, account information, etc.) to infer whether or not the transaction 224 is associated with fraudulent activity. The resulting output may be referred to as first fraud detection 232.

Similarly, commerce transaction platform 228 may apply second machine learning model to the same transaction 224 and features thereof, to again infer whether or not the transaction 224 is associated with fraudulent activity and generate second fraud detection 234.

Commerce transaction platform 228 may detect fraud associated with the transaction 224 based on the first fraud detection 232 and the second fraud detection 234. For example, commerce transaction platform 228 may apply fraud detection logic 226 to the first fraud detection 232 and second fraud detection 234 to determine whether or not transaction 224 is to be deemed as fraudulent. Fraud detection logic 226 may include one or more rules (e.g., logic operations) with that may compare the first fraud detection 232 and/or the second fraud detection 234 against a condition or threshold. For example, fraud detection logic 226 may include a rule that IF first fraud detection 232 OR second fraud detection 234 indicate FRAUD (the condition or threshold), THEN deem the transaction 224 as fraudulent and block. In an example, a rule may state that IF first fraud detection 232 (e.g., a score) combined with second fraud detection 234 (e.g., a second score)>threshold value, THEN deem transaction 224 to be fraudulent and block. The rule may be stored in settings 238 and modified according to admin 236, or automatically (e.g., in response to the rate of transactions that the system blocks). For example, in response to a threshold rate of transactions being blocked exceeding an upper threshold, commerce transaction platform 228 may automatically adjust fraud detection logic 226 from requiring just one of the outputs to indicate fraud (e.g., OR) to requiring both of the outputs to indicate fraud (e.g., AND). Similarly, in response to the threshold rate of transactions being blocked satisfying a lower threshold, the detection logic 226 may be automatically adjusted to block the transaction in response to when either the first fraud detection 232 OR second fraud detection 234 indicate fraud.

In an embodiment, the commerce transaction platform 228 may deem transaction 224 to be fraudulent in response to the first fraud detection 232 being positive or the second fraud detection being positive. Positive, in this context, may refer to a positive indication of fraud, and negative may refer to a negative indication of fraud. In example, if any one of the first fraud detection 232 or the second fraud detection 234 indicate fraud (e.g., positive), then the commerce transaction platform 228 may deem the transaction 224 to be fraudulent, and otherwise not. In another embodiment, in response to both the first fraud detection 232 and the second fraud detection 234 being positive, the commerce transaction platform 228 may deem the transaction 224 to be fraudulent, and otherwise not. In another embodiment, charge path 222 may compare the combined first fraud detection 232 and second fraud detection 234 against a threshold and, if satisfied, may deem the transaction to be fraudulent, and otherwise not.

Charge path 222 may include operations that forwards the transaction 224 to a merchant account (with one or more authorization tokens) to complete the transaction 224 when the transaction is not deemed to be fraudulent. In response to deeming the transaction 224 as fraudulent, charge path 222 may block the transaction 224, and log the transaction as being associated with fraud. In such a case, the commerce transaction platform 228 refrains from forwarding the transaction 224 to the merchant account, so that the transaction 224 does not complete.

In an embodiment, a system administrator 236 may tune settings 238 of the commerce transaction platform 228 to configure behavior of fraud detection logic 226. In an embodiment, commerce transaction platform 228 may tune settings 238 automatically (e.g., without input from a human), to increase or reduce the number of transactions that are blocked as being fraudulent. For example, commerce transaction platform 228 may determine that a quantity of transactions that are blocked by the first machine learning model exceeds a threshold, and disable blocking of a future transaction or transactions in response to the threshold being exceeded. For example, if in the past 'y' days or 'z' number of transactions, commerce transaction platform 120 blocks 'n' number of transactions, and this exceeds a threshold of 'm' blocked transactions within 'y' days or 'z' number of transactions, then commerce transaction platform 120 may automatically deprecate one and/or both of the ML models or refrain from blocking future transactions.

In an embodiment, the commerce transaction platform 228 may track how many transactions that each machine learning model is blocking for a given merchant, and if a model blocks more than a threshold number of transactions, commerce transaction platform 228 may deprecate the first machine learning model 204 for that merchant. Commerce transaction platform 228 may process subsequent transactions for that merchant with a single machine learning model (e.g., second machine learning model 206). In an embodiment, commerce transaction platform 228 may deploy the first machine learning model 204 in response to detecting an anomaly (e.g., the number of fraudulent activity for a given merchant exceeds a threshold). Similarly, the commerce transaction platform may deprecate the first machine model 206 in response to the passing of the anomaly (e.g., the number of fraudulent activity no longer exceeding a threshold), or other reasons, as described in other sections.

Figure 3:
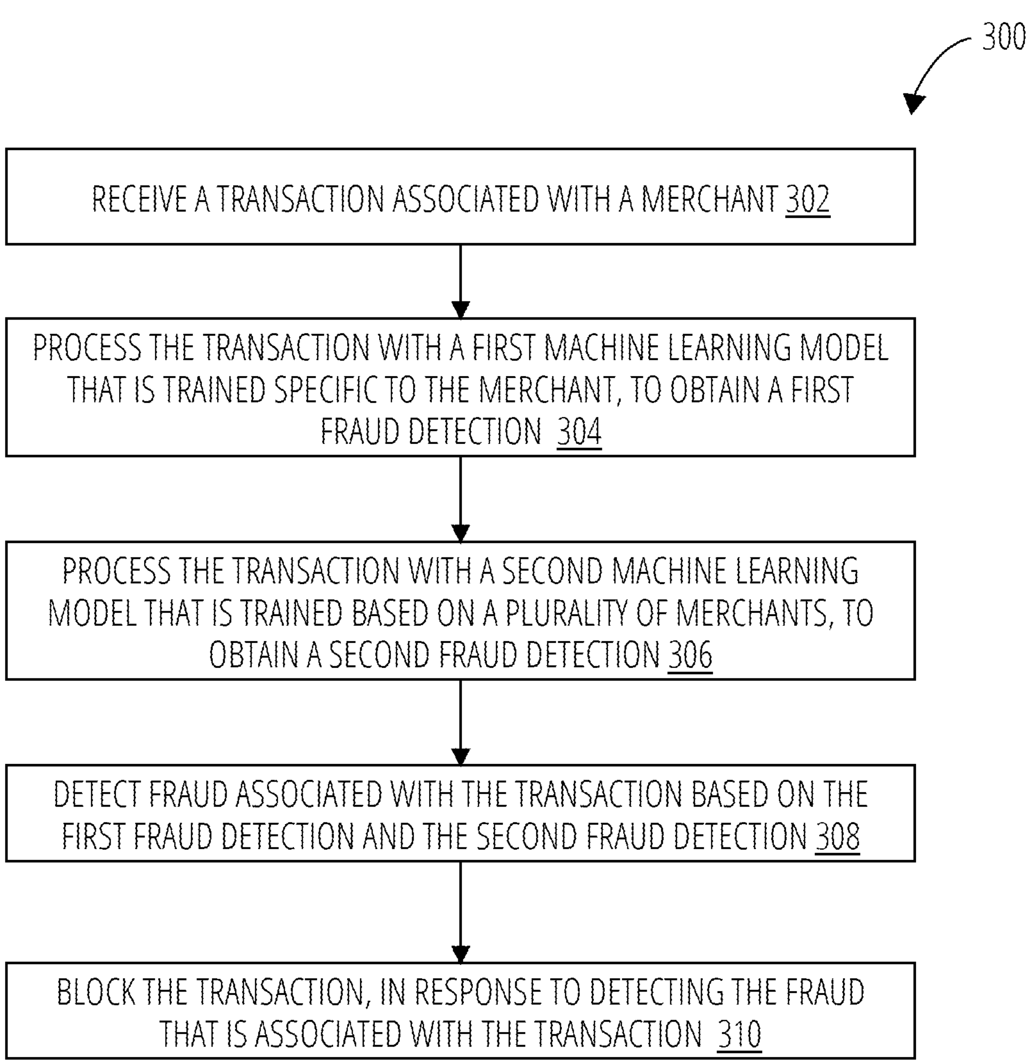
FIG. 3 shows a flow diagram of a process for detecting a fraudulent electronic transaction with a commerce transaction platform, in accordance with an embodiment.

FIG. 3 shows a flow diagram of a process 300 for detecting a fraudulent electronic transaction with a commerce transaction platform, according to an embodiment. The process 300 may be performed by processing logic that may comprise hardware (circuitry, dedicated logic, etc.), software (such as is run on a general purpose computer system or a dedicated machine), firmware, or a combination. In one embodiment, the process 300 is performed by a commerce transaction platform (e.g., 120, 228).

At block 302, processing logic receives a transaction associated with a merchant. The transaction may include a request to complete a transaction (e.g., an exchange of money and/or goods) between an end user and a merchant, as well as payment information, shipping information, account details, time stamps, goods to be sold, an amount of the transaction, etc.

At block 304, processing logic processes the transaction with a first machine learning model that is trained specific to the merchant, to obtain a first fraud detection. The first machine learning model may be referred to as a targeted machine learning model that has a smaller memory footprint, is trained on a smaller data set, and may be more recent in time, relative to a second machine learning model.

At block 306, processing logic processes the transaction with a second machine learning model that is trained based on a plurality of merchants, to obtain a second fraud detection. The second machine learning model may be referred to as a general machine learning model. In an aspect, the first machine learning model and the second machine learning model may comprise different types of machine learning algorithms.

At block 308, processing logic detects fraud associated with the transaction based on the first fraud detection and the second fraud detection. For example, processing logic may apply one or more logical operations such as 'if any one of the first fraud detection or the second fraud detection indicate fraud, then block transaction', or 'if both of the first fraud detection and the second fraud detection indicate fraud, then block transaction'. The logical operations or rules may vary depending on application or settings.

At block 310, processing logic blocks the transaction, in response to detecting the fraud that is associated with the transaction. For example, in response to detecting the fraud, processing logic refrains from sending signaling to the merchant account to complete the transaction (e.g., an exchange of goods for funds, etc.) In response to not detecting the fraud, processing logic may send signaling to the merchant account, resulting in an electronic authorization to complete the transaction.

Figure 4:
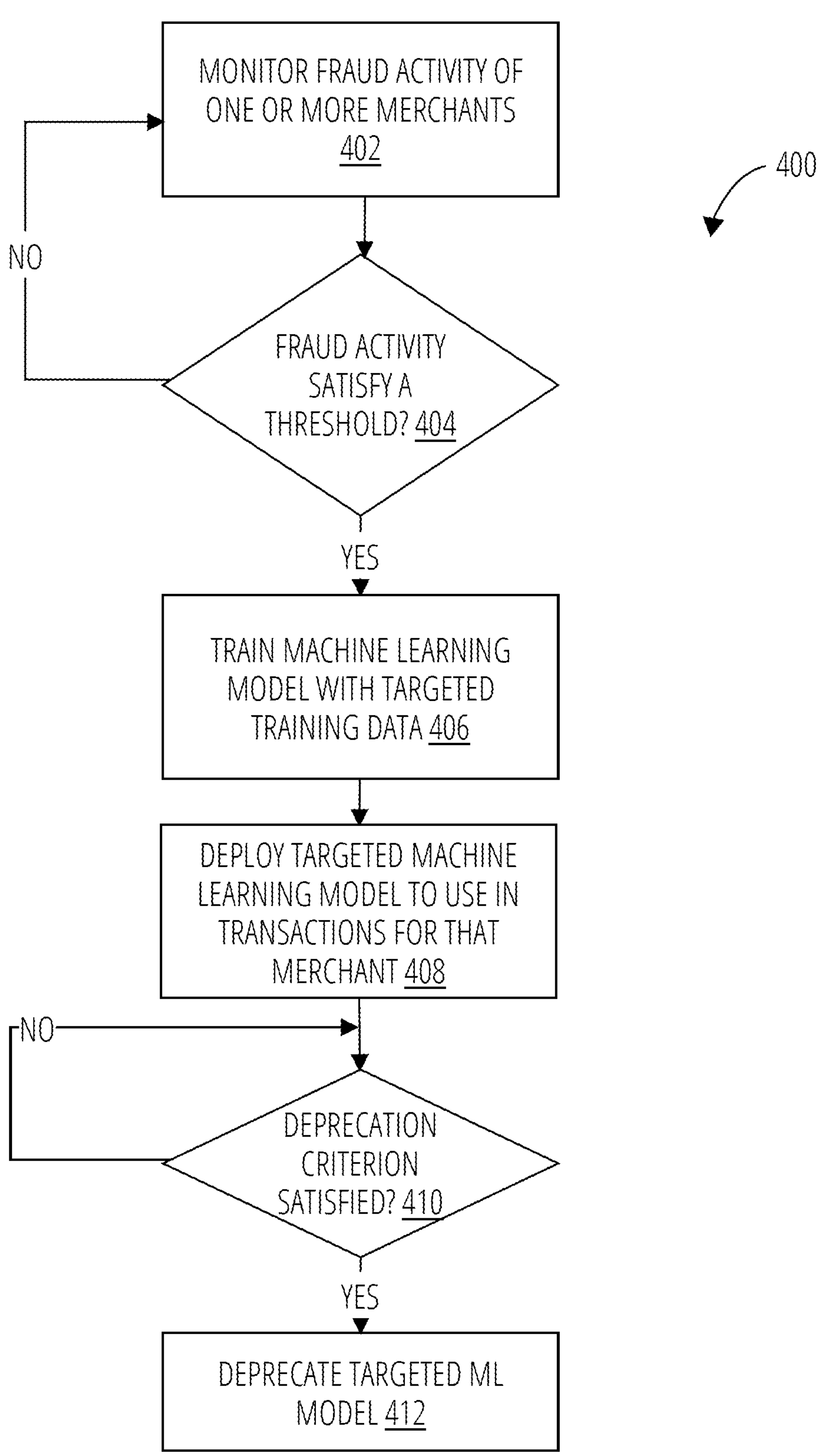
FIG. 4 shows a flow diagram of a process 400 for training and deploying a targeted machine learning model for detecting a fraudulent electronic transaction with a commerce transaction platform, in accordance with an embodiment.

FIG. 4 shows a flow diagram of a process 400 for training and deploying a targeted machine learning model for detecting a fraudulent electronic transaction with a commerce transaction platform, according to an embodiment. The process 400 may be performed by processing logic that may comprise hardware (circuitry, dedicated logic, etc.), software (such as is run on a general purpose computer system or a dedicated machine), firmware, or a combination. In one embodiment, the process may performed by a commerce transaction platform (e.g., 120, 228).

At block 402, processing logic may monitor fraud activity of one or more merchants. This may include monitoring one or more of: the number or rate of fraud reported by each merchant, the number or rate of disputes reported by end users (e.g., buyers) for transactions made with each merchant, or fraud that is detected by a general machine learning model (e.g., 104, 206).

At block 404, if the fraud activity satisfies a threshold, processing logic may proceed to block 406. If not, processing logic may continue to monitor fraud activity at block 402. The fraud activity may exceed the threshold specifically for one of the merchants.

At block 406, processing logic may train a machine learning model with targeted training data. The targeted training data may comprise transactions solely from the merchant that is experiencing the increased fraud activity that exceeded the threshold. The training data may be selected to include the transactions occurring within the duration of the increased fraud activity. The resulting machine learning model may be referred to as a targeted machine learning model.

At block 408, processing logic may deploy the targeted machine learning model to use future transactions for that merchant. Deploying a model may activate the targeted machine learning model to potentially block the future transactions. This may be applied alongside the more general machine learning model.

At block 410, processing logic may determine whether or not deprecation criterion is satisfied. For example, deprecation criterion may specify that if a number of transactions blocked by the targeted machine learning model is above a threshold, the targeted machine learning model is to be deprecated (e.g., deactivated). Such a behavior may indicate that the targeted machine learning model is overly aggressive and generating false positives. Additionally, or alternatively, deprecation criterion may specify to deprecate the targeted machine learning model after a pre-defined duration of time (e.g., X days). If the deprecation criterion is satisfied, processing logic may proceed to block 412.

At block 412, processing logic may deprecate the targeted machine learning model. This may include deactivating the targeted machine learning model so that the commerce transaction platform refrains from applying the targeted machine learning model to block future transactions.

In an embodiment, this process 400 may be performed for each merchant in parallel. Further, the process may be repeated over time to train and deploy new targeted machine learning models, when fraud activity spikes, and deprecate them when no longer needed.

Figure 5:
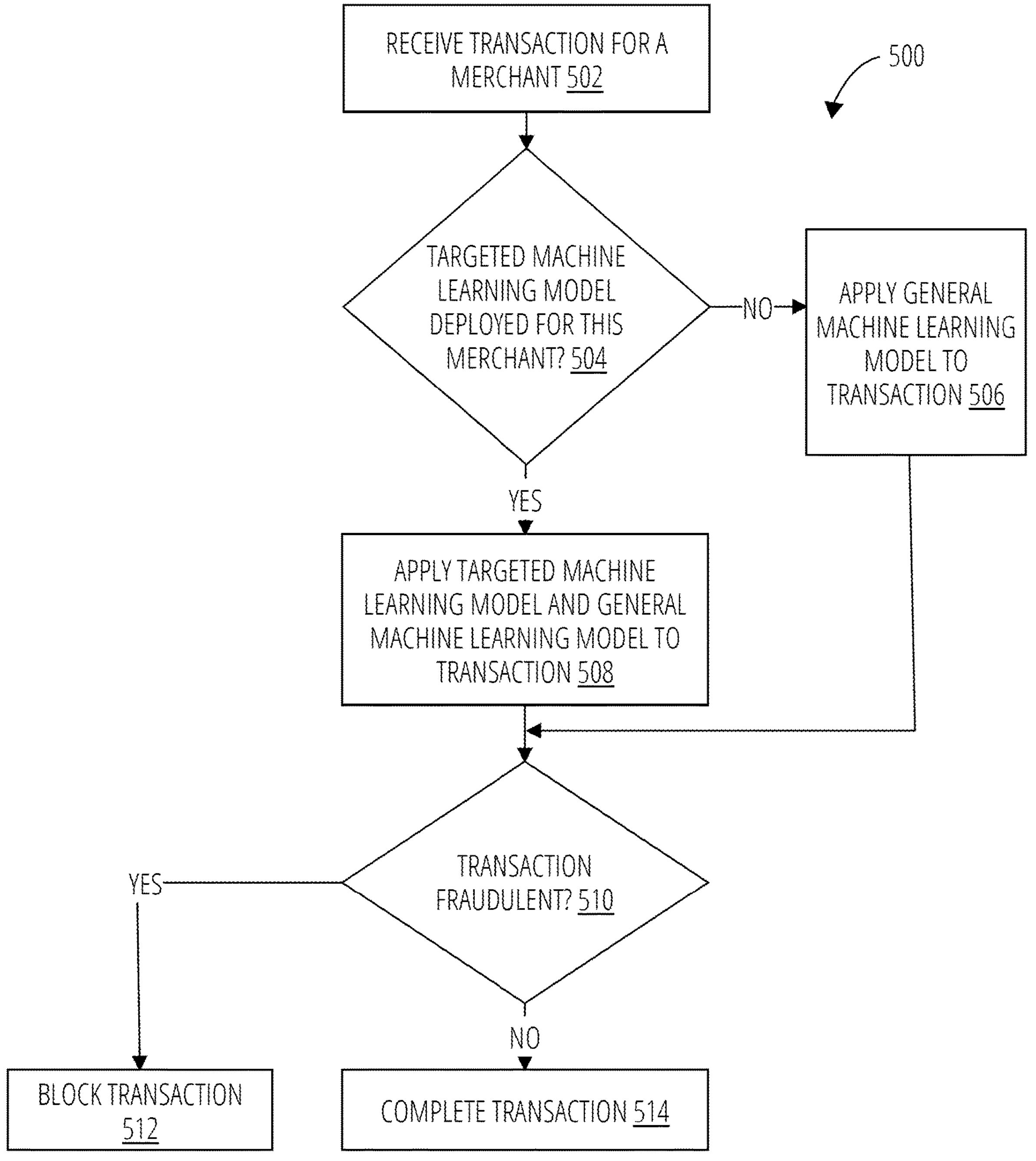
FIG. 5 shows a flow diagram of a process for detecting a fraudulent electronic transaction with a commerce transaction platform that implements dual machine learning models, in accordance with an embodiment.

FIG. 5 shows a flow diagram of a process 500 for detecting a fraudulent electronic transaction with a commerce transaction platform that implements dual machine learning models, according to an aspect. The process 500 may be performed by processing logic that may comprise hardware (circuitry, dedicated logic, etc.), software (such as is run on a general purpose computer system or a dedicated machine), firmware, or a combination. In one embodiment, the process may performed by a commerce transaction platform (e.g., 120, 228).

At block 502, processing logic receives a transaction for a merchant. The transaction may include a request to complete a transaction (e.g., an exchange of money and/or goods) between an end user and a merchant, as well as data for that transaction such as, for example, payment information, shipping information, account details, time stamp of the transaction, goods to be exchanged, an amount of the transaction, etc.

At block 504, processing logic determines if a targeted machine learning model is deployed for the merchant. For example, processing logic may reference a flag or field to determine if the merchant associated with the received transaction has deployed for it, a targeted machine learning model (e.g., deployed based on process 400).

If the targeted machine learning model is not deployed, processing logic proceeds to block 506 and applies the general machine learning model to the transaction. As described, the general machine learning model may be trained with transactions that are not specific or directed to a single merchant. If the targeted model is deployed for that merchant, processing logic may proceed to block 508 and apply both the targeted machine learning model and the general machine learning model.

At block 510, processing logic may determine if the transaction is to be deemed as fraudulent, based on applying the general machine learning model at block 506 or applying both the general machine learning model and the targeted machine learning model at block 508. Processing logic may apply fraud detection logic on the results of the machine learning models, as described in other sections, to determine if the transaction is to be deemed as being fraudulent or not.

If not fraudulent, processing logic may proceed to block 514 and complete the transaction. This may include sending signaling to a merchant system (e.g., a merchant account) to authorize and trigger an exchange (e.g., of funds and/or goods), as described.

If the transaction is deemed to be fraudulent, processing logic may proceed to block 512 and block transaction. In such a case, processing logic refrains from authorizing and/or triggering the exchange with the merchant system. Processing logic may store, in memory, a record of each blocked transaction.

Figure 6:
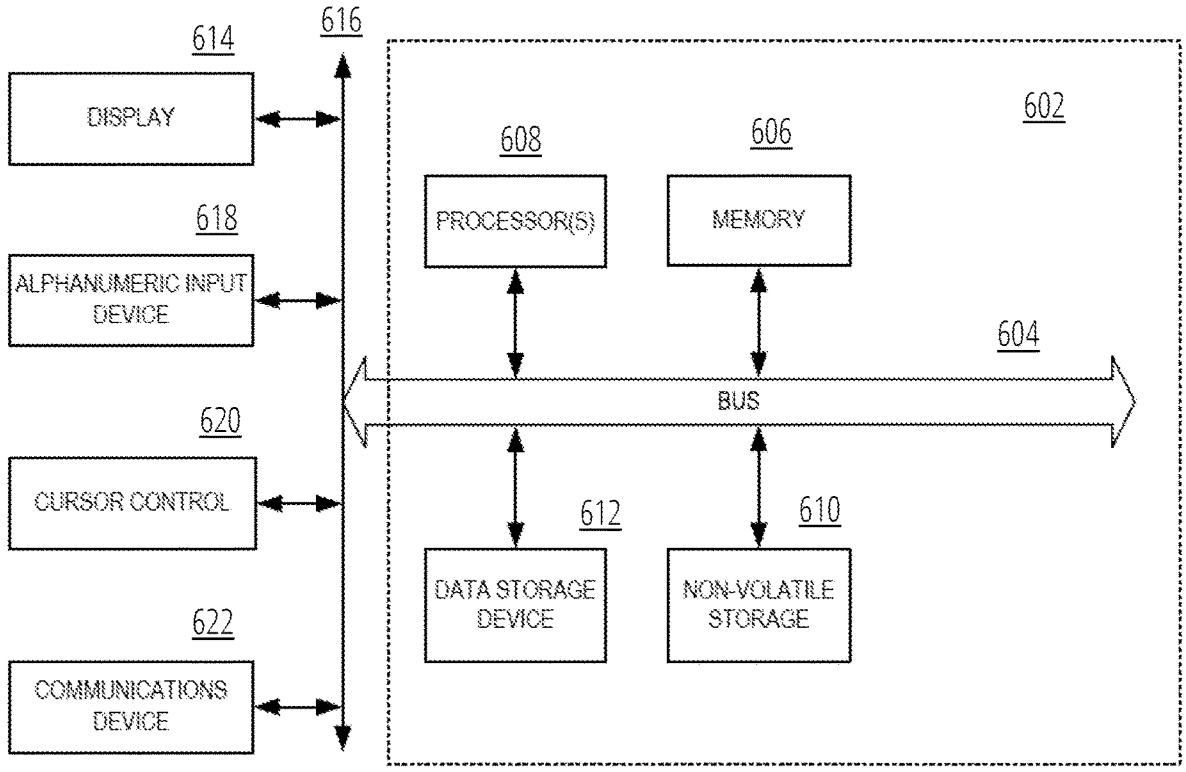
FIG. 6 is one embodiment of a computer system that may be used to support the systems and operations described, in accordance with an embodiment.

FIG. 6 is one embodiment of a computer system that may be used to support the systems and operations described, in accordance with an embodiment. For example, the computer system illustrated in FIG. 6 may be used by a commerce platform system, a merchant development system, merchant user system, etc. It will be apparent to those of ordinary skill in the art, however that other alternative systems of various system architectures may also be used.

The computer system 602 illustrated in FIG. 6 includes a bus or other internal communication means 604 for communicating information, and one or more processors 608 coupled to the bus 604 for processing information. The system further comprises a random access memory (RAM) or other volatile storage device 606 (referred to as memory), coupled to bus 604 for storing information and instructions to be executed by processor 608. Main memory 606 also may be used for storing temporary variables or other intermediate information during execution of instructions by processor 608. The system also comprises a read only memory (ROM), non-volatile storage, and/or static storage device 610 coupled to bus 604 for storing static information and instructions for processor 608, and a data storage device 612 such as a magnetic disk or optical disk and its corresponding disk drive. Data storage device 612 is coupled to bus 604 for storing information and instructions.

The system may further be coupled to a display device 614, such as a light emitting diode (LED) display or a liquid crystal display (LCD) coupled to bus 604 through bus 616 for displaying information to a computer user. An alphanumeric input device 618, including alphanumeric and other keys, may also be coupled to bus 604 through bus 616 for communicating information and command selections to processor 608. An additional user input device is cursor control device 620, such as a touchpad, mouse, a trackball, stylus, or cursor direction keys coupled to bus 604 through bus 616 for communicating direction information and command selections to processor 608, and for controlling cursor movement on display device 614.

Another device, which may optionally be coupled to computer system 602, is a communication device 622 for accessing other nodes of a distributed system via a network. The communication device 622 may include any of a number of commercially available networking peripheral devices such as those used for coupling to an Ethernet, token ring, Internet, or wide area network. The communication device 622 may further be a null-modem connection, or any other mechanism that provides connectivity between the computer system 602 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 606, mass storage device 612, or other storage medium locally or remotely accessible to processor 608.

It will be apparent to those of ordinary skill in the art that the system, method, and process described herein can be implemented as software stored in main memory 606 or read only memory and executed by processor 608. This control logic or software may also be resident on an article of manufacture comprising a computer readable medium having computer readable program code embodied therein and being readable by the mass storage device 612 and for causing the processor 608 to operate in accordance with the methods and teachings herein.

The embodiments discussed herein may also be embodied in a handheld or portable device containing a subset of the computer hardware components described above. For example, the handheld device may be configured to contain only the bus 604, the processor 608, and memory 606 and/or 612. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 608, a data storage device 612, a bus 604, and memory 606, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method performed by a server computer system for detecting a fraudulent electronic request, comprising:

detecting, by the server computer system over a computer network, increased fraud activity associated with an entity, in accordance with the detected increased fraud activity satisfying a first threshold, training, by the server computer system, a portable first machine learning model with first training data that corresponds to the increased fraud activity of the entity;

receiving, by the server computer system, a request associated with the entity;

selecting, by the server computer system, the portable first machine learning model from a plurality of machine learning models that are each trained with the first training data that is specific to a respective entity associated with the request;

processing, by the server computer system, the request with the portable first machine learning model, to obtain a first fraud detection;

processing, by the server computer system, the request with a second machine learning model that is trained based on second training data that is associated with a plurality of entities, wherein the second training data occurs over a second time span that is greater than a first time span that the first training data occurs over, to obtain a second fraud detection;

detecting, by the server computer system, fraud associated with the request based on the first fraud detection and the second fraud detection;

responsive to detecting the fraud that is associated with the request, blocking the request by the server computer system;

tracking, by the server computer system, a quantity of requests blocked by the portable first machine learning model for the entity;

responsive to determining that the quantity of requests that are blocked by the portable first machine learning model exceeds a second threshold, automatically deprecating, by the server computer system, the portable first machine learning model for the entity; and processing, by the server computer system, a subsequent request for the entity using the second machine learning model.

2. The method of claim 1, wherein the fraud is detected based on the first fraud detection being positive or the second fraud detection being positive.

3. The method of claim 1, further comprising:

responsive to determining that the quantity of requests that are blocked by the portable first machine learning model exceeds the second threshold, disabling blocking of a future request associated with the entity.

4. The method of claim 1, wherein the first training data comprises a plurality of first past requests from the entity that the portable first machine learning model is applied with respect to.

5. The method of claim 4, wherein the second training data comprises a plurality of second past requests from the plurality of entities.

6. The method of claim 1, wherein a duration associated with the first training data starts when the increased fraud activity satisfies the first threshold, and ends when the increased fraud activity does not satisfy the first threshold.

7. The method of claim 1, wherein the first training data is more recent than the second training data.

8. The method of claim 1, wherein the detecting of the increased fraud activity and the training of the portable first machine learning model are performed by the server computer system without a human input.

9. A non-transitory computer readable storage medium storing instructions, which when executed by a server computer system, cause the computer system to perform operations for detecting a fraudulent electronic request, the operations comprising:

detecting, by the server computer system over a computer network, increased fraud activity associated with an entity, in accordance with the detected increased fraud activity satisfying a first threshold, training, by the server computer system, a portable first machine learning model with first training data that corresponds to the increased fraud activity of the entity;

receiving, by the server computer system, a request associated with the entity;

selecting, by the server computer system, the portable first machine learning model from a plurality of machine learning models that are each trained with first training data that is specific to a respective entity associated with the request;

processing, by the server computer system, the request with the portable first machine learning model, to obtain a first fraud detection;

processing, by the server computer system, the request with a second machine learning model that is trained based on second training data that is associated with a plurality of entities, wherein the second training data occurs over a second time span that is greater than a first time span that the first training data occurs over, to obtain a second fraud detection;

detecting, by the server computer system, fraud associated with the request based on the first fraud detection and the second fraud detection;

responsive to detecting the fraud that is associated with the request, blocking the request by the server computer system;

tracking, by the server computer system, a quantity of requests blocked by the portable first machine learning model for the entity;

responsive to determining that the quantity of requests that are blocked by the portable first machine learning model exceeds a second threshold, automatically deprecating, by the server computer system, the portable first machine learning model for the entity; and processing, by the server computer system, a subsequent request for the entity using the second machine learning model.

10. The non-transitory computer readable storage medium of claim 9, wherein the fraud is detected based on the first fraud detection being positive or the second fraud detection being positive.

11. The non-transitory computer readable storage medium of claim 9, wherein the operations further comprise:

responsive to determining that the quantity of requests that are blocked by the portable first machine learning model exceeds the second threshold, disabling blocking of a future request associated with the entity.

12. The non-transitory computer readable storage medium of claim 9, wherein the first training data comprises a plurality of first past requests from the entity that the portable first machine learning model is applied with respect to.

13. The non-transitory computer readable storage medium of claim 12, wherein the second training data comprises a plurality of second past requests from the plurality of entities.

14. The non-transitory computer readable storage medium of claim 9, wherein a duration associated with the first training data starts when the increased fraud activity satisfies the first threshold, and ends when the increased fraud activity does not satisfy the first threshold.

15. A server computer system for detecting a fraudulent electronic request, the server computer system comprising:

a memory; and one or more processors coupled with the memory configured to cause the server computer system to perform operations, comprising:

detecting over a computer network, increased fraud activity associated with an entity;

in accordance with the detected increased fraud activity satisfying a first threshold, training a portable first machine learning model with first training data that corresponds to the increased fraud activity of the entity;

receiving a request associated with the entity;

selecting the portable first machine learning model from a plurality of machine learning models that are each trained with first training data that is specific to a respective entity associated with the request;

processing the request with the portable first machine learning model, to obtain a first fraud detection;

processing the request with a second machine learning model that is trained based on second training data that is associated with a plurality of entities, wherein the second training data occurs over a second time span that is greater than a first time span that the first training data occurs over, to obtain a second fraud detection;

detecting fraud associated with the request based on the first fraud detection and the second fraud detection;

responsive to detecting the fraud that is associated with the request, blocking the request;

tracking a quantity of requests blocked by the portable first machine learning model for the entity;

responsive to determining that the quantity of requests that are blocked by the portable first machine learning model exceeds a second threshold, automatically deprecating the portable first machine learning model for the entity; and processing a subsequent request for the entity using the second machine learning model.

16. The server computer system of claim 15, wherein the fraud is detected based on the first fraud detection being positive or the second fraud detection being positive.

17. The server computer system of claim 15, wherein the operations further comprise:

responsive to determining that the quantity of requests that are blocked by the portable first machine learning model exceeds the second threshold, disabling blocking of a future request associated with the entity.

18. The server computer system of claim 17, wherein the first training data comprises a plurality of first past requests from the entity that the portable first machine learning model is applied with respect to.

19. The server computer system of claim 18, wherein the second training data comprises a plurality of second past requests from the plurality of entities.

20. The server computer system of claim 15, wherein a duration associated with the first training data starts when the increased fraud activity satisfies the first threshold, and ends when the increased fraud activity does not satisfy the first threshold.

* * * * *